Dec. 28, 1937.  J. H. HERR  2,103,946
SHOCK ABSORBER
Filed May 20, 1936
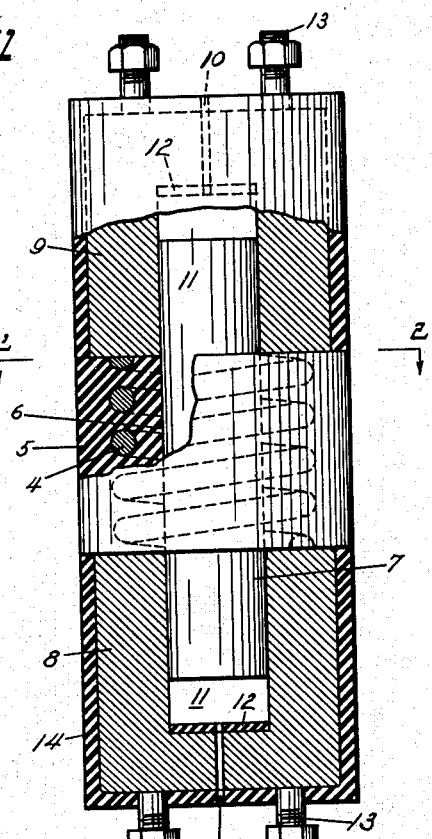
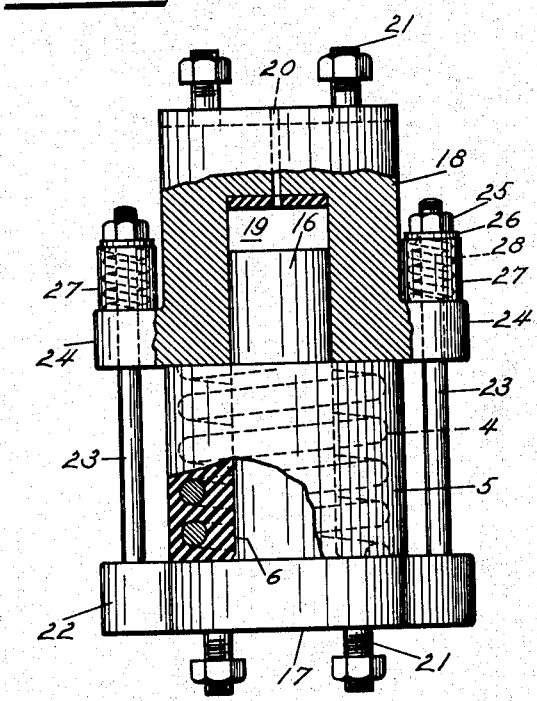
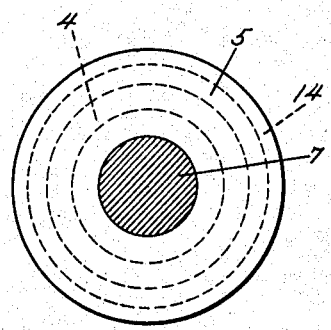
John H. Herr
INVENTOR
BY *Victor J. Evans & Co.*
ATTORNEYS Patented Dec. 28, 1937

2,103,946

UNITED STATES PATENT OFFICE 2,103,946

SHOCK ABSORBER

John H. Herr, Palisade, N. J.

Application May 20, 1936, Serial No. 80,852

3 Claims. (Cl. 267—33)

The present invention relates to shock absorbers and more particularly to devices of this character employing a resilient compression member for absorbing the shock or rebound.

One of the objects of the invention resides in providing a shock absorbing device of simple construction, the same being readily adapted in the wheel suspension of a motor vehicle.

A further object of the invention is to provide a shock absorber of rugged character, the same being adapted for use in conjunction with the mounting of heavy machinery so as to absorb the vibrations or impacts of same and thereby silence their operation.

The invention will be fully and comprehensively understood from a consideration of the following detailed description when read in connection with the accompanying drawing which forms part of the application.

In the drawing:

Fig. 1 is a side elevational view of one form of the shock absorber, portions thereof being broken away in central section.

Fig. 2 is a transverse sectional view taken on the plane 2—2 of Fig. 1; and

Fig. 3 is a side elevational view with portions broken away in central section of a second form of the shock absorber.

Referring now to the drawing for a detailed description thereof and particularly to Figs. 1 and 2, the numeral 4 indicates a suitable compression spring preferably formed of a spiral wire or rod. The spring 4 is entirely encased in a cylinder 5 fabricated of a suitable resilient material such as rubber. The resilient cylinder 5 has centrally formed therein an axial bore 6 in which a rigid rod 7 is disposed.

The rod 7 may be frictionally engaged in the bore 6 by forming the resilient cylinder 5 so as to compress against the rod 7. In this form of the shock absorber the rod 7 is arranged to project from each end of the cylinder 5, which portions are slidably journalled in rigid sleeves 8 and 9. The respective sleeves 8 and 9 are arranged so that their corresponding ends abut the ends of the rubber in cylinder 5. Each of the sleeves 8 and 9 is closed at its free end, in which portion is provided a vent aperture 10 communicating to the interior of the sleeve. At the end of the chamber 11, formed in each of the sleeves 8 and 9 and in which the rod 7 slides as a piston, a rubber washer 12 is disposed so as to cushion the impact of the respective sleeves 8 and 9 against the ends of the guide rod 7.

Suitable attachment means such as the threaded studs 13 project from the sleeves 8 and 9, by which the shock absorber may be operatively attached to a vehicle. The sleeves 8 and 9 are each encased in a rubber covering 14, the same being preferably formed integral with the resilient cylinder 5.

In the modified form of the shock absorber illustrated in Fig. 3 the compression spring 4 is also employed, the same being embedded in the resilient cylinder 5. Within the axial bore 6 of the cylinder is disposed a guide rod 16 which preferably projects perpendicularly from a saddle plate 17 and extends thru the bore 6 beyond the opposite end of the cylinder 5. The projecting portion of the guide rod 16 is slidably journalled in a sleeve 18 the interior of which forms a chamber 19, the rod 16 acting as a piston therein. The sleeve 18 is closed at one end thru which is formed a vent aperture 20. The saddle plate 17 and the sleeve 18 are arranged to abut opposed ends of the cylinder 5, suitable attachment means such as the threaded studs 21 being provided on each of these members.

A plurality of lugs 22 extending laterally from the saddle plate 17 form supports for a series of tension rods 23, portions of which slidably engage in corresponding ears 24 projecting from the sides of the sleeve 18. The free ends of each of the rods 23 are threaded to receive a nut 25 and a washer 26, the latter forming an adjustable collar.

Surrounding each of the rods 23 is a resilient cylindrical member 27, the same being arranged to form a cushion between the washer 26 and the corresponding ear 24. The resilient members 27 are preferably composed of a spiral spring 28 embedded in a rubber cylinder in similar manner to the structure of the cylinder 5. In use the nuts 25 are turned down on the rods 23 so as to compress the members 27 and in turn to initially compress the cylinder 5. Accordingly, the cylinder 5 and its associated compression spring 4 functions to absorb the initial impact or shock and as same again expands the compression members 27 act to cushion the rebound. During this action the rod 16 sliding within the chamber 19 expels and draws in air thru the vent 20, the latter being constricted sufficiently to retard the passage of the air thru same.

With reference to the first form of the shock absorber shown in Figs. 1 and 2, the ends of the rod 7 sliding within the chambers 11 function in a similar manner, during the movement of which the vents 10, being constricted, control the entrance and exhaust of the air from the chamber 11. In this form the rubber covering 14 surrounding the sleeves 8 and 9 acts as a rebound absorbent, the same being tensioned during the rebound action.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. The combination of a compression spring embedded in a cylinder of resilient material having an axial bore thru same, a guide rod disposed in said bore and projecting beyond same, a sleeve journalling said guide rod and abutting said cylinder, a saddle plate carrying said rod and abutting said cylinder, and a plurality of tension rods projecting from said saddle plate and having their free ends engaging said sleeve whereby to compress said sleeve against said resilient cylinder.

2. The combination of a compression spring embedded in a cylinder of resilient material having an axial bore thru same, a guide rod disposed in said bore and projecting beyond same, a sleeve journalling said guide rod and abutting said cylinder, a saddle plate carrying said rod and abutting said cylinder and a plurality of tension rods projecting from said saddle plate and slidably engaging said sleeve, a collar on each of said tension rods and a resilient member cushioning said collar on said sleeve.

3. The combination of a compression spring embedded in a cylinder of resilient material having an axial bore thru same, a guide rod disposed in said bore and projecting beyond same, a sleeve journalling said guide rod and abutting said cylinder, a saddle plate carrying said rod and abutting said cylinder and a plurality of tension rods projecting from said saddle plate and slidably engaging said sleeve, a collar on each of said tension rods and a resilient member cushioning said collar on said sleeve and comprising a compression spring embedded in resilient material.

JOHN H. HERR.